(12) United States Patent
Jackson et al.

(10) Patent No.: US 8,544,246 B2
(45) Date of Patent: Oct. 1, 2013

(54) SELF ENGAGING WING LAWN MOWER

(75) Inventors: Gordon W Jackson, Clayton, NC (US);
William R. Best, Emerson, NC (US);
Harold E. Mills, Raleigh, NC (US)

(73) Assignee: GXi Holdings, LLC, Clayton, NC (US)

( * ) Notice: Subject to any disclaimer, the term of this patent is extended or adjusted under 35 U.S.C. 154(b) by 0 days.

(21) Appl. No.: 12/779,185

(22) Filed: May 13, 2010

(65) Prior Publication Data

US 2011/0277434 A1 Nov. 17, 2011

(51) Int. Cl.
*A01D 75/30* (2006.01)
(52) U.S. Cl.
USPC .................................................. 56/6; 56/13.6
(58) Field of Classification Search
USPC .......... 56/6, 13.6, 13.5, 320.1; 474/144–146, 474/151
See application file for complete search history.

(56) References Cited

U.S. PATENT DOCUMENTS

| | | | |
|---|---|---|---|
| 2,952,961 A * | 9/1960 | Engler | 56/13.6 |
| 3,152,431 A * | 10/1964 | Beaman, Jr. et al. | 56/13.6 |
| 3,339,353 A * | 9/1967 | Schreyer | 56/6 |
| 3,500,619 A * | 3/1970 | Bacon | 56/6 |
| 4,068,452 A * | 1/1978 | Schaefer et al. | 56/11.6 |
| 4,395,865 A * | 8/1983 | Davis et al. | 56/13.3 |
| 4,497,160 A * | 2/1985 | Mullet et al. | 56/6 |
| 5,254,046 A * | 10/1993 | Hohnl | 474/101 |
| 5,483,787 A * | 1/1996 | Berrios | 56/10.1 |
| 7,237,629 B1 * | 7/2007 | Bland et al. | 180/6.24 |
| 2009/0308037 A1 * | 12/2009 | Wang et al. | 56/11.6 |

* cited by examiner

*Primary Examiner* — Alicia Torres
(74) *Attorney, Agent, or Firm* — James G. Passé; Passé Intellectual Property, LLC

(57) ABSTRACT

A wing lawn mower for cutting grass is herein described. The wing lawn mower is attached to a main mower, the wing mower moveable from a lowered position to a raised position. When in the lowered position, the wing mower is driven by a wing belt, which is in turn driven by a main mower deck pulley. When the wing mower is moved to the raised position, the wing belt becomes slack. The slack causes the wing mower blades to cease turning. Then the wing mower is lowered into the cutting position, the wing belt pulled taught. When this occurs, the wing belt is guided back into place against the wing pulley by belt retainers. This allows the wing mower to be raised and lowered without having to remove or reconfigure the wing belt.

12 Claims, 10 Drawing Sheets

SELF ENGAGING WING LAWN MOWER

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to motorized power equipment and more specifically to a self engaging wing lawn mower.

2. Description of Related Art

Lawn mowing equipment may come in various sizes and may be intended for various applications. For example, in small residential applications, a push mower may be used wherein the push mower may have a gasoline powered engine that directly turns a mower blade. As the mower blade rotates quickly, the blade cuts grass to a predetermined height. The cut grass may then be directed to a grass outlet or may be continuously cut and grass mulch may be produced.

For larger applications, a riding mower may be more efficient. A riding lawn mower may also have a gasoline powered engine. In this instance, the engine may not only provide the energy to turn the mower blade or blades but may also be responsible for providing the power to propel the riding lawn mower. Typically, a riding lawn mower may have two or more mower blades which are installed under a mower deck with the mowing deck configured to allow some overlap of the cutting swath of the two blades. Similar to the push mower, as the lawn mower blades rotate, the mower blades cut grass to a predetermined height.

In lawn mowing applications requiring a larger swath of grass to be cut, mowers employing more than two blades may be used. In these instances, the lawn mower may be a lawn mower that is towed behind a tractor or other type of towing vehicle. The tow behind mower may have one or two blades in a main deck as well as side decks that are attached to the towed lawn mower. For even larger applications, multiple towed mowers may be used to increase the amount of grass cut.

In some prior art tow behind mowers, the side decks may not be disengaged easily and raised to reduce the size of the mower. This is advantageous when storing the mower. In some prior art mowers, the mowers are fixed into place and are not adjustable. In other mowers, the units may be detached but pieces of the mower may need to be removed prior to detaching or adjusting the mowers for storage. In other lawn mowers, the side decks must be manually disconnected from the drive system before they can be raised. Disconnecting the side mowers may be time consuming, difficult and dangerous.

The present invention overcomes some of the difficulties of the previous mowing systems by providing an integrated belt drive system that allows the side mower decks to be raised and the belt drive systems automatically disengaged from the drive system. In one embodiment of the present invention, the wing mowers may be raised and locked into place by simply removing a locking pin, raising the side deck and then reinserting the locking pin into a second position to lock the side deck into the raised position. In this position, the blades are disengaged and no other action may be required on the operator's part to continue using the main deck to cut grass.

SUMMARY OF THE INVENTION

The present disclosure recognizes these needs and discloses such a mower. A lawn mower is disclosed. The lawn mower has a main mower deck which has a main deck pulley. The main mower deck is connected to a wing mower. The wing mower is affixed to the main mower deck by support arms. The wing mower is moveable between a lowered position and a raised position. Further, the wing mower has a wing mower pulley and the main deck pulley is attached to the wing mower pulley by a wing mower belt. The wing mower belt has tension applied by a tension pulley when the wing mower is in a lowered position. The tension applied to the wing mower belt is removed by the movement of the wing mower into the raised position. The wing mower belt is held in place around the wing mower pulley by wing mower belt retainers which are affixed around the circumference of the wing mower pulley.

A wing mower is disclosed. The wing mower has a wing pulley which is positioned on a wing mower deck. The wing mower deck has support arms. The support arms are configured to connect the wing mower to a main mower deck. The wing mower also has a wing tension pulley positioned on the wing mower deck. The wing pulley and wing tension pulley are configured to accept a wing belt. The wing tension pulley provides tension to the wing belt when the wing mower is in a lowered position. The wing mower is moveable between the lowered position and a raised position. When the wing mower is in the lowered position the wing mower is operable and when in the raised position, the wing mower is inoperable.

DETAILED DESCRIPTION OF THE INVENTION

Figure 1:
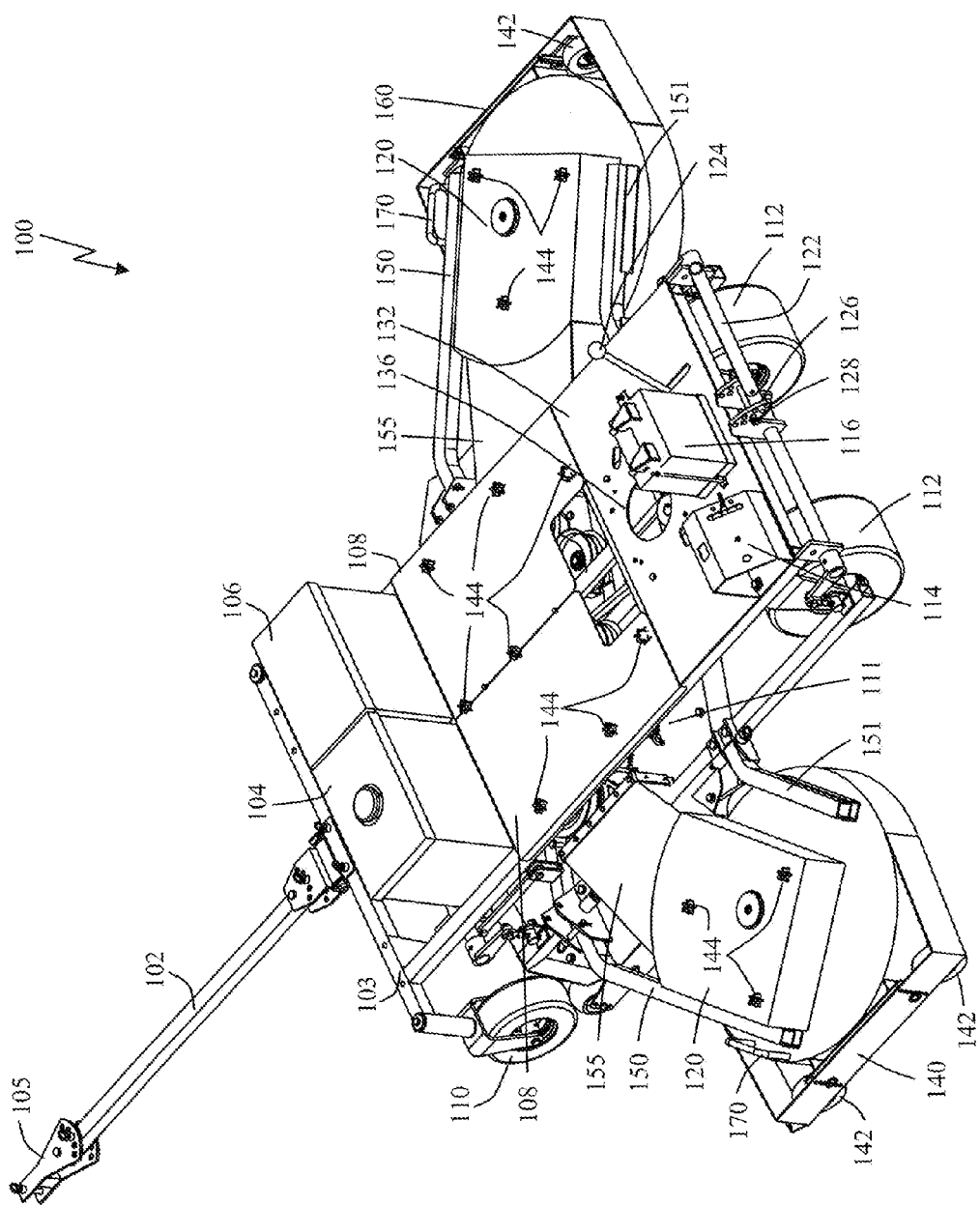
FIG. 1 displays a side perspective view of a tow behind lawn mower using one embodiment of the present invention.

While this invention is susceptible to embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in several views of the drawings. This detailed description defines the meaning of the terms used herein and specifically describes embodiments in order for those skilled in the art to practice the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

FIG. 1 displays a rear perspective view of a mower 100 in accordance with one embodiment of the present invention. The mower 100 has a main mower deck 111 which is supported underneath a frame 103. The main mower deck 111 has two deck guards 108 on frame 103 which protect the pulleys and belts from debris as well as the user from getting tangled in the moving parts. In addition, the frame 103 has an engine platform 132 upon which an engine sits (for ease of illustration, the engine is not shown). On the engine platform 132 is a control panel 114 and a battery 116. The control panel 114 may have an on/off switch, a starter selection, throttle control and the like. The battery provides power to start the engine.

On the top of the main mower deck 111 are the various pulleys and belts. When engaged, the pulleys turn mower blades which are located under the main mower deck 111. As is explained in greater detail in subsequent sections, the pulleys and belts are connected in a closed loop to allow the motor to turn all of the mower blades of the mower 100.

Through the engine platform 132 extends a blade engagement lever 124. When the engine is running and the blades of the mower need to be engaged, the blade engagement lever 124 is moved from an off position to an engaged position. Also in the engine platform 132 is a hole 136 that the crankshaft of the engine extends through to engage the pulley system of the mower 100.

On the front of the mower is a tow bar 102. One end of the tow bar 102 attaches to the frame 103 of the mower 100. At the other end of the tow bar 102 is a tow hitch 105. The tow hitch 105 may attach to a tractor or other type of towing equipment. In the embodiment of FIG. 1, the tow bar 102 may be positioned at various points along the frame 103. By positioning the tow bar 102 at different positions along the frame 103, the offset of the mower 100 from the towing vehicle may be adjusted. Mowers can be ganged and pulled one behind another, each offset differently to cut a large amount of turf.

Located on the inside of the frame 103 is a fuel tank 104 and a tool box 106. The fuel tank 104 stores the fuel necessary for the engine to operate. Inside the tool box 106, the operator may store tools or other items that may be handy during the operation of the mower 100. For example, extra belts, wrenches screw drivers, pliers, gloves or the like may be stored in the tool box 106. At the front lower corners of the frame 103 are two front wheels 110. The front wheels 110 may pivot allowing the mower 100 to be moved in the direction of the towing equipment. On the rear lower corners of the frame 103 are two rear wheels 112. In this embodiment, the rear wheels 112 do not pivot. By not pivoting, the rear wheels 112 keep the mower 100 moving in a straight line behind the towing equipment.

The height of the grass cut may be changed by adjusting the height of the main mower deck 111 of the mower 100. In the embodiment of FIG. 1, the height of the mower may be adjusted at the front end and back end of the mower 100. To adjust the height of the rear of the mower 100, a height adjustment handle 122 may be inserted into a rear adjustment receptacle 126. Once inserted into the adjustment receptacle, the height adjustment handle 122 may be moved in a downward direction to raise the height of the main mower deck 111. Conversely, the height adjustment handle may be moved in an upwards direction to lower the main mower deck 111. The height of the main mower deck is independent from the height of the frame 103. Once the height of the main mower deck 111 has reached a desired height, a height adjustment pin 128 may be inserted into predetermined locations and the height is locked into place. The same procedure may be applied to the front of the mower 100 to adjust the height of the main mower deck at the front of the mower 100. Once the height of both front and rear has been adjusted to the desired height and locked into place, the height adjustment handle 122 may be removed and stored at a location away from the mower 100.

On either side of the main mower deck 111 are two wing mowers, a left wing mower 140 and a right wing mower 160. The wing mowers 140 and 160 are attached to the main mower deck 111 by a front support arm 150 and a rear support arm 151. On the wing mowers 140 and 160 are deck wheels 142. In a preferred embodiment, the wing deck wheels 142 may be adjustable by simple and quick pin connections. In an alternative embodiment the deck wheels 142 are attached at a fixed height, but may be adjusted by bolting the wheels in a different hole. Deck wheels 142 should be adjusted to for the same cut height as the main deck 111 to ensure an even cut for the mower 100.

On the top of the wing mowers 140 and 160 are wing mower guards 120 and belt guards 155. The wing mower guards 120 and belt guards 155 may protect the operator from becoming entangled in the moving parts, such as pulleys and belts, as well as protect the moving parts from debris when in operation. In a preferred embodiment, the belt guards 155 are flexible to allow it to expand taught when the wing mowers are in the lowered position. When the wing mowers 140 and 160 are raised, the belt guards 155 collapse. The wing mower guards 120 are affixed into place by threaded knobs 144. Removal of the threaded knobs 144 allows the wing mower guards 120 to be removed and access to the belts and pulleys is facilitated. Also shown on the wing mowers 140 and 160 is a handle 170. The handle 170 allows the operator to manually raise the wing mowers 140 and 160 and store them in an upright position safely (not having to reach under the deck).

In the embodiment of FIG. 1, the front and rear support arms 150 and 151 are coupled with the main mower deck 111 which allows the wing mowers 140 and 160 to rotate up from the main mower deck 111 to move from a lowered position to a raised position. As is explained in more detailed description of the wing mowers 140 and 160, the wing mowers 140 and 160 may articulate in a downward direction as well as an upward direction within limitations of the belts.

Figure 2:
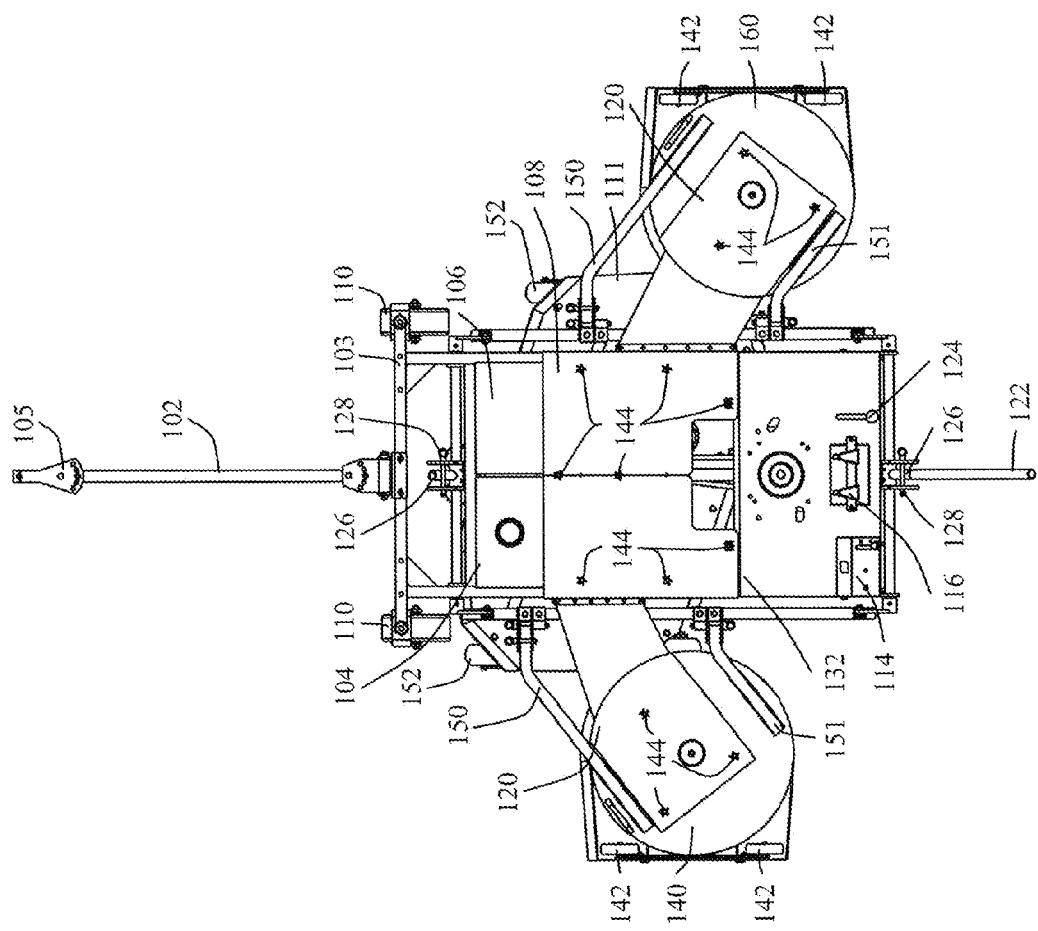
FIG. 2 shows a top down view of the tow behind lawn mower of FIG. 1.

FIG. 2 shows a top view of the mower 100. As can be seen by this view, the wing mowers 140 and 160 are slightly offset from each other. This position of the wing mowers 140 and 160 in relation to the main mower deck 111 allows the mower blades to overlap and prevent leaving streaks of uncut grass.

The different locations where the tow bar 102 may be attached to the main frame 103 are shown in FIG. 2. In this embodiment, there may be a right, center, and left position of the tow bar 102. Also shown in FIG. 2 are main mower deck anti-scalping wheels 152. The anti-scalping wheels 152 prevent the mower 100 from "bottoming out" when the mower 100 encounters a large change in ground elevation. When this major change in terrain is encountered, the anti-scalping wheels 152 will come into contact with the ground and will keep the mower blades at a minimum height, thus preventing "scalping" the grass.

Figure 3:
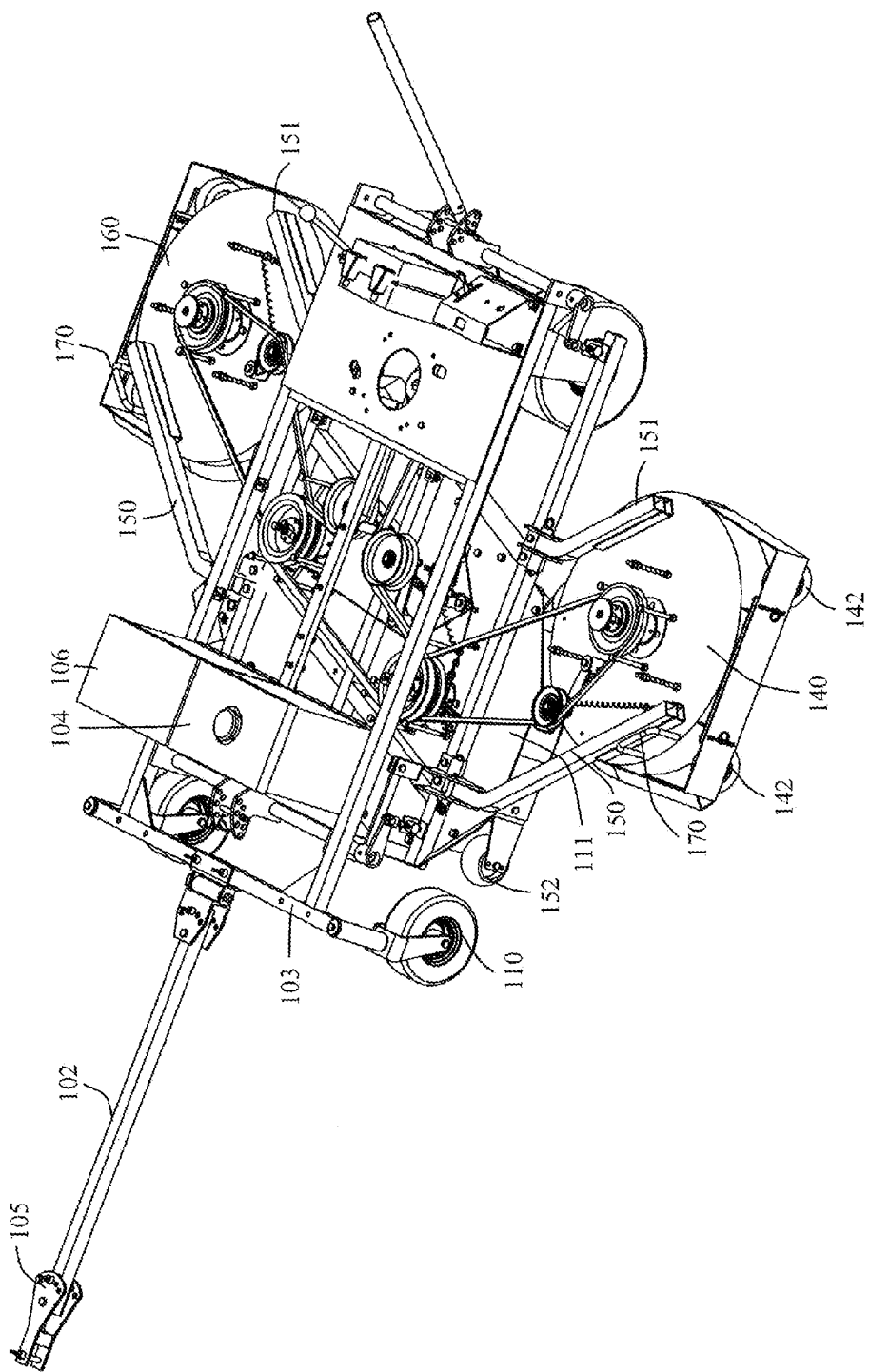
FIG. 3 displays a side perspective view of the town behind lawn mower of FIG. 1 with the safety guards removed.

FIG. 3 displays the mower 100 with the main deck guard 108 belt guards 155, and wing mower guards 120 removed. When the main deck guard 108 is removed, the operator may access the main mower deck 111. Similarly, with the wing mower guards 120 removed, the operator may gain access to the pulleys and belts of the wing mowers 140 and 160 without removing the belt guards 155.

Figure 4:
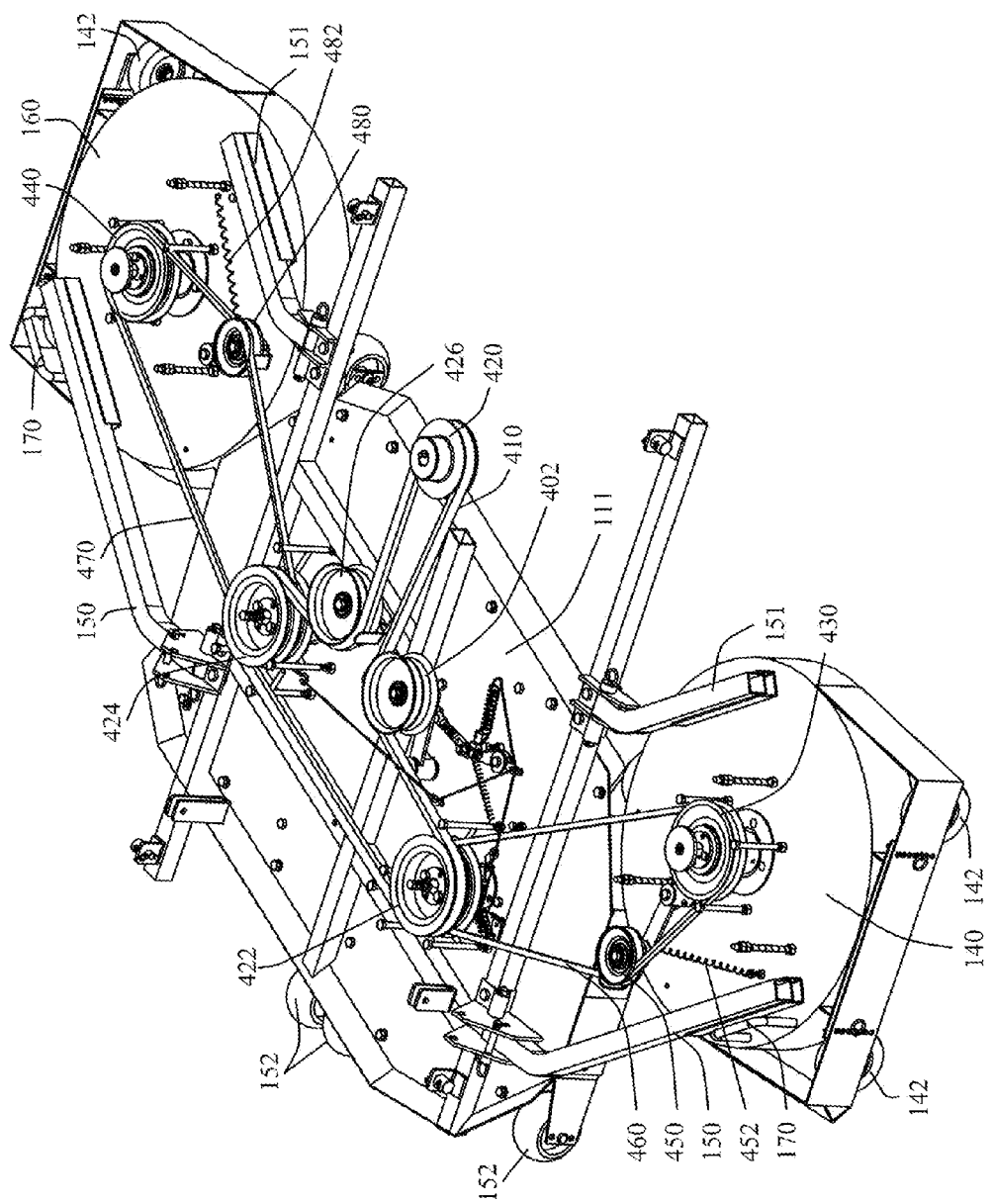
FIG. 4 shows a side perspective view of the mower decks of the tow behind mower of FIG. 1.

FIG. 4 shows the main mower deck 111 and wing mowers 140 and 160 removed from the frame 103 (See FIG. 1) of the mower 100. On the main mower deck 111 is a main clutch pulley 402, a left main deck pulley 422, a right main deck pulley 424, and an idler pulley 426. The left main deck pulley 422 and right main deck pulley 424 are connected to mower blades (not shown for ease of illustration) which are on the underside of the main mower deck 111. When the right and left main deck pulleys 424 and 422 are spinning, the blades are also rotating at the same speed. Connecting the main clutch pulley 402, the left main deck pulley 422, the right main deck pulley 424, and the idler pulley 426 is a main deck belt 410. The main deck belt is driven by a main drive pulley 420. The main drive pulley 420 is directly coupled to the engine. When the engine is running and the main deck belt 410 is engaged, the main drive pulley 420 is turning the pulleys on the main mower deck 111.

The left main deck pulley 422 and the right main deck pulley 424 have two grooves, a top and bottom groove. In the embodiment of FIG. 4, the top groove is where the main deck belt 410 is attached. The bottom groove of the left main deck pulley 422 and the right main deck pulley 424 are where a left wing belt 460 and a right wing belt 470, respectively, are attached.

On the left wing mower 140 is a left wing pulley 430 and a left tension pulley 450. The left wing belt 460 is routed around the left main pulley 422, the left wing pulley 430 and the left tension pulley 450. Also attached to the left tension pulley 450 is a left tension pulley spring 452. When the left wing mower 140 is in the lowered position (as shown in FIG. 4), the left tension pulley 450 provides tension to the left wing belt 460 via the left tension spring 452. As is described in the discussion of FIGS. 6 and 7, when the left wing mower 140 is moved into the raised position, the distance between the left wing pulley 430 and the left main deck pulley 422 decreases thus causing the left wing belt 460 to become slack. The travel of the left tension pulley 450 is not enough to cause the left wing belt 460 to remain taught when the left wing mower 140 is rotated to the raised position.

Similarly, on the right wing mower 160 is a right wing pulley 440 and a right tension pulley 480. The right wing belt 470 is routed around the right main pulley 424, the right wing pulley 440 and the right tension pulley 480. Also attached to the right tension pulley 480 is a right tension pulley spring 482. When the right wing mower 160 is in the lowered position (as shown in FIG. 4), the right tension pulley 480 provides tension to the right wing belt 470 via the right tension spring 482. As is described in the discussion of FIGS. 8 and 9, when the right wing mower 160 is moved into the raised position, the distance between the right wing pulley 440 and the right main deck pulley 424 decreases thus causing the right wing belt 470 to become slack. The travel of the right tension pulley 480 is not enough to cause the right wing belt 470 to remain taught when the right wing mower 160 is rotated to the raised position. Thus when the wing deck is raised the blade is automatically disengaged.

Figure 5:
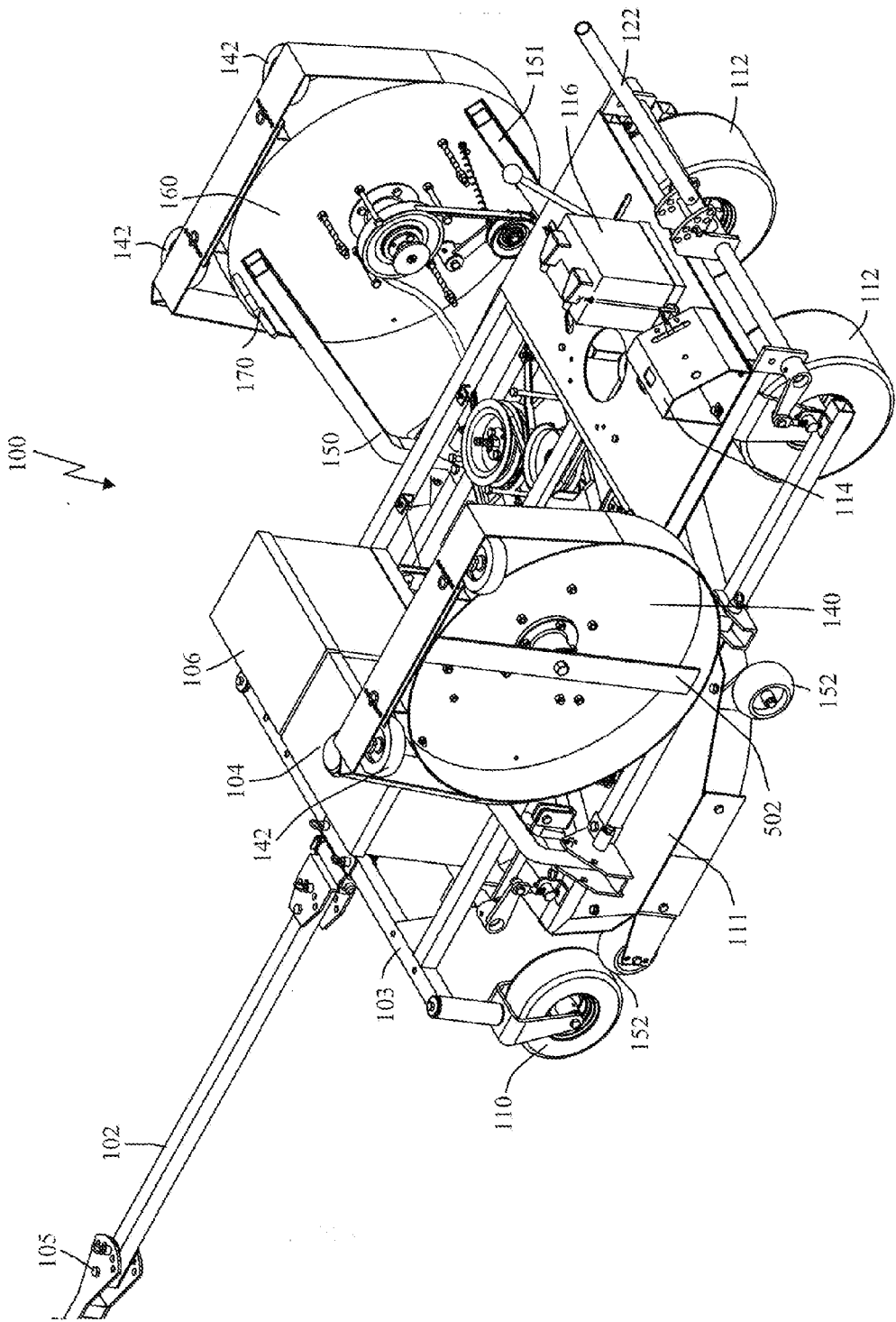
FIG. 5 shows a side perspective view of the tow behind mower of FIG. 1 with the side decks raised with the supporting frame removed.

FIG. 5 displays the mower 100 with the left and right wing mowers 140 and 160 in the raised position. The operator may rotate the left and right wing mowers 140 and 160 to the raised position by grasping the handle 170 and lifting upwards. In the embodiment as shown in FIG. 5 the raised position is about 90 degrees with relation to the main mower deck 111. In another embodiment, the left and right wing mowers 140 and 160 may fold farther inwards, greater than 90 degrees, depending on the clearance of the left and right wing mowers 140 and 160. It may be advantageous to fold the left and right wing mowers 140 and 160 beyond 90 degrees for storage as it may reduce the overall height of the mower 100 when left and right wing mowers 140 and 160 are in the raised position. In yet another alternate embodiment, the left and right wing mowers 140 and 160 may be designed to be rotatable to multiple positions (i.e. 45 degrees, 90 degrees, 120 degrees etc.).

Figure 6:
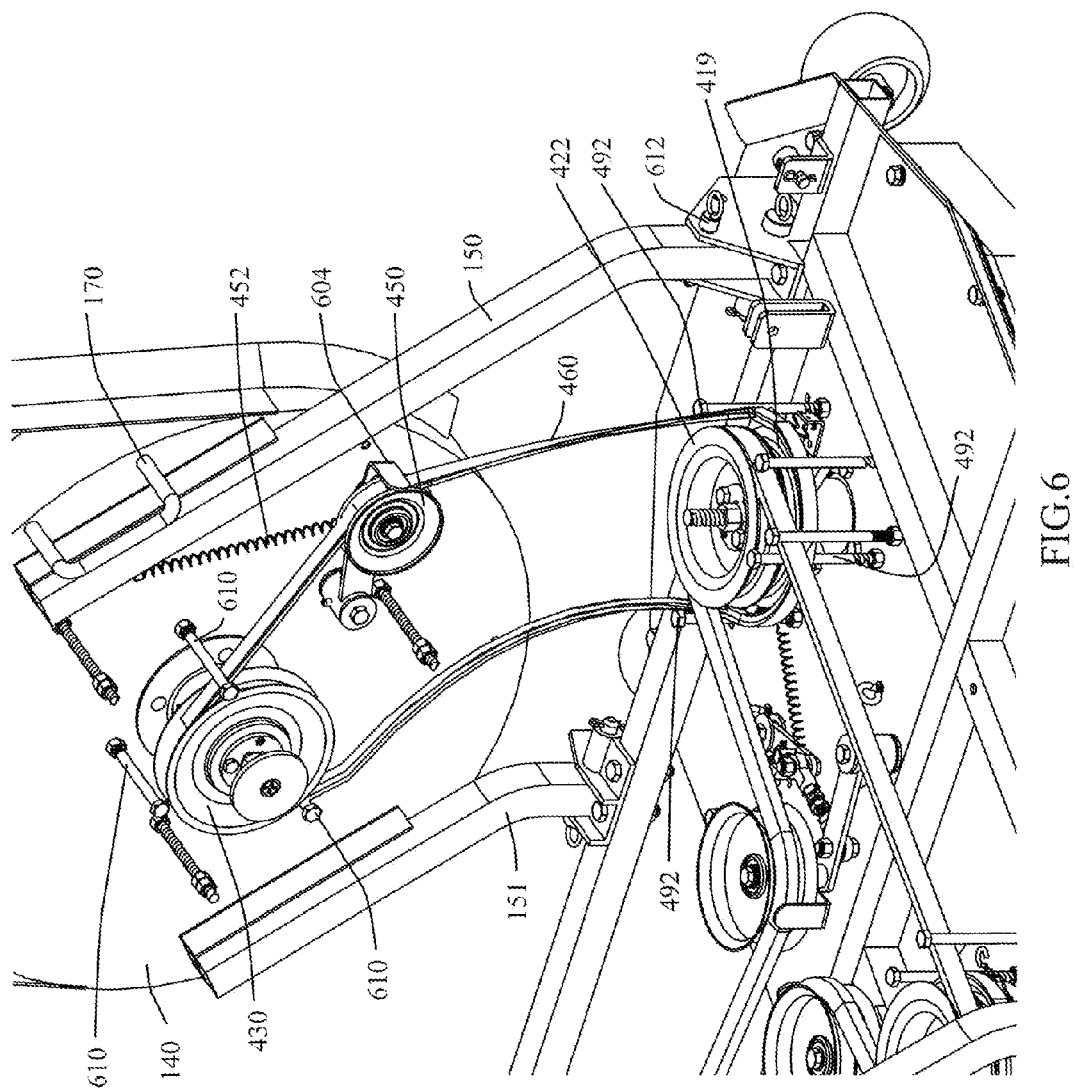
FIG. 6 shows a front perspective view of a left wing mower in a raised position in accordance with one aspect of the present invention.

FIG. 6 displays a front perspective view of the left wing mower 140. In the embodiment shown, three belt retainers 610 are shown dispersed around the left wing pulley 430. The belt retainers 610 may be positioned to keep the left wing belt 460 from traveling too far away from the left wing pulley 430. In one embodiment the belt retainers 610 may be positioned around the circumference of the left wing pulley 430 such that there is very little clearance between the edge of the left wing pulley 430 and the belt retainers 610. In this embodiment, it may be necessary to remove the belt retainers 610 when removing the left wing belt 460. When the left wing mower 140 is in the lowered position, the tension on the left wing belt 460 keeps it from coming into contact with the belt retainers 610. When the left wing mower 140 is in the raised position, the slack experienced by the left wing belt 460 may be enough to cause the left wing belt 460 to move off left wing pulley 430, if not kept in place by the belt retainers 610.

The left wing belt 460 belt may be kept in place on the left wing pulley 430 so all belt slack is directed to the left main deck pulley 422 on the main deck when the left wing mower 140 is raised to the raised position. The slack in the left wing belt 460 is directed to the left main deck pulley 422. This decouples the left wing mower 140 from the main mower deck by removing the left wing belt 460 belt from the pulley groove 419 on the left main deck pulley 422. When a portion of the left wing belt 460 is removed from the pulley groove 419, main deck belt retainers 492 on the main mower deck 111 support the remaining portion of the left wing belt 460 that remains close to the main drive pulley 422. As can be seen in FIG. 6, the slack in the left wing belt 460 may protrude away from the main deck pulley 422 between the three main deck pulley retainers 492. When the left wing mower 140 is lowered back into the operating position, the slack in the left wing belt 460 is removed and the main deck pulley retainers 492 guide the belt back into position in the pulley groove 419. When this occurs, the left wing belt 460 re-enters the pulley groove 419, thus enabling power to be provided to the left wing mower 140.

Also keeping the left wing belt 460 in place on the tension pulley 450 is a left tension pulley retainer 604. In the embodiment of FIG. 6, the left tension pulley retainer 604 may be in a fixed position in relation to the tension pulley 450. When the left wing mower 140 is in the raised position, the left tension pulley retainer 604 may provide pressure against the left wing belt 460 keeping it from coming off the left tension pulley 450. As mentioned previously, the left tension pulley 450 and left tension spring 452 provides sufficient tension to the left wing belt 460 to keep it taught enough to operate the left wing mower 140 when in the lowered position.

On the front support arm 150 of the left wing mower 140 is a locking pin 612. When the left wing mower 140 is in the lowered position, the locking pin may be installed in a lower pin position. When the left wing mower 140 is in the lowered position, the locking pin 612 may be installed such that the movement of the left wing mower 140 may be limited to a certain predetermined articulation. For example, the left wing mower may travel about 15 degrees upwards and 10 degrees downward. This may be advantageous when mowing an undulating area of grass.

One aspect of the present invention is that when the left wing mower 140 is in the raised position, the operator may operate the right wing mower 160 in a normal fashion when the right wing mower 160 is in the lowered position. The left wing belt 460 is displaced off the left drive pulley. As mentioned previously, the slack of the left wing belt 460 directed to the left wing mower driving pulley 490 removes the left wing belt 460 belt from the pulley groove 419 on the left wing mower driving pulley 490. Thus, the left wing mower driving pulley 490 may be turning but not engaging the left wing belt 460.

Figure 7:
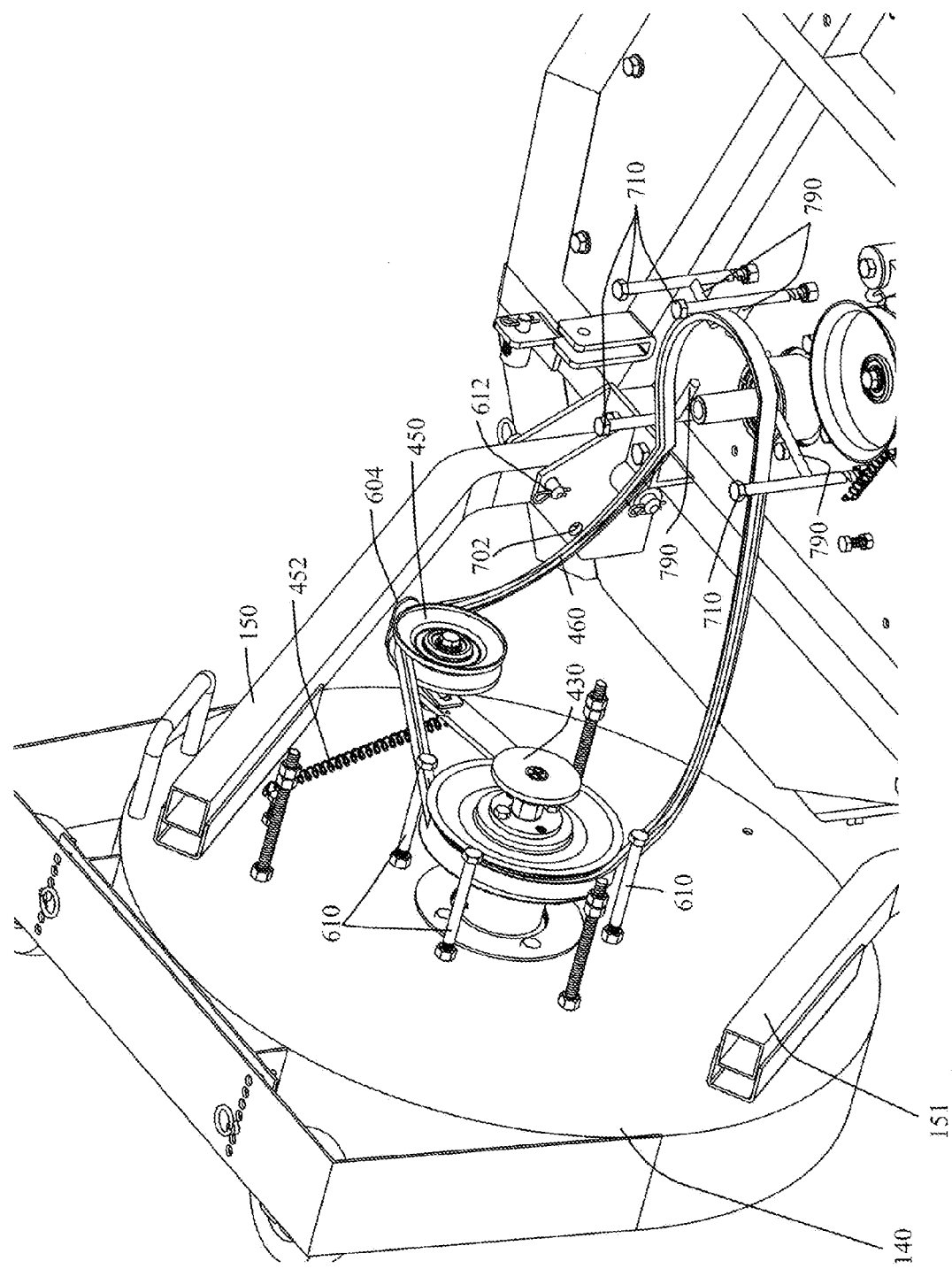
FIG. 7 shows a rear perspective view of the left wing mower of FIG. 6.

FIG. 7 displays a rear perspective view of the left wing mower 140 in the raised position with the main deck pulley removed for ease of illustration. As was also shown in FIG. 6, in the raised position, the left wing belt 460 becomes slack with the slack being directed back to the left main deck pulley 422. Located around the left main deck pulley are belt posts 710 on which are attached belt supports 790. In the embodiment of FIG. 7 there are 4 belt posts 710 and belt supports 790. However, in alternative embodiments, the number of belt posts may vary. When the left wing mower is raised, the left wing belt 460 experiences slack and the left wing belt 460 may move out of its groove on the left main deck pulley 422. When this occurs, the left wing belt 460 may be supported by belt supports 790. Also seen in this figure is the lower pin position 702. As mentioned previously, when the left wing mower 140 is lowered, the locking pin 612 may be placed in the lower pin position 702 to either provide a maximum articulation limit.

Figure 8:
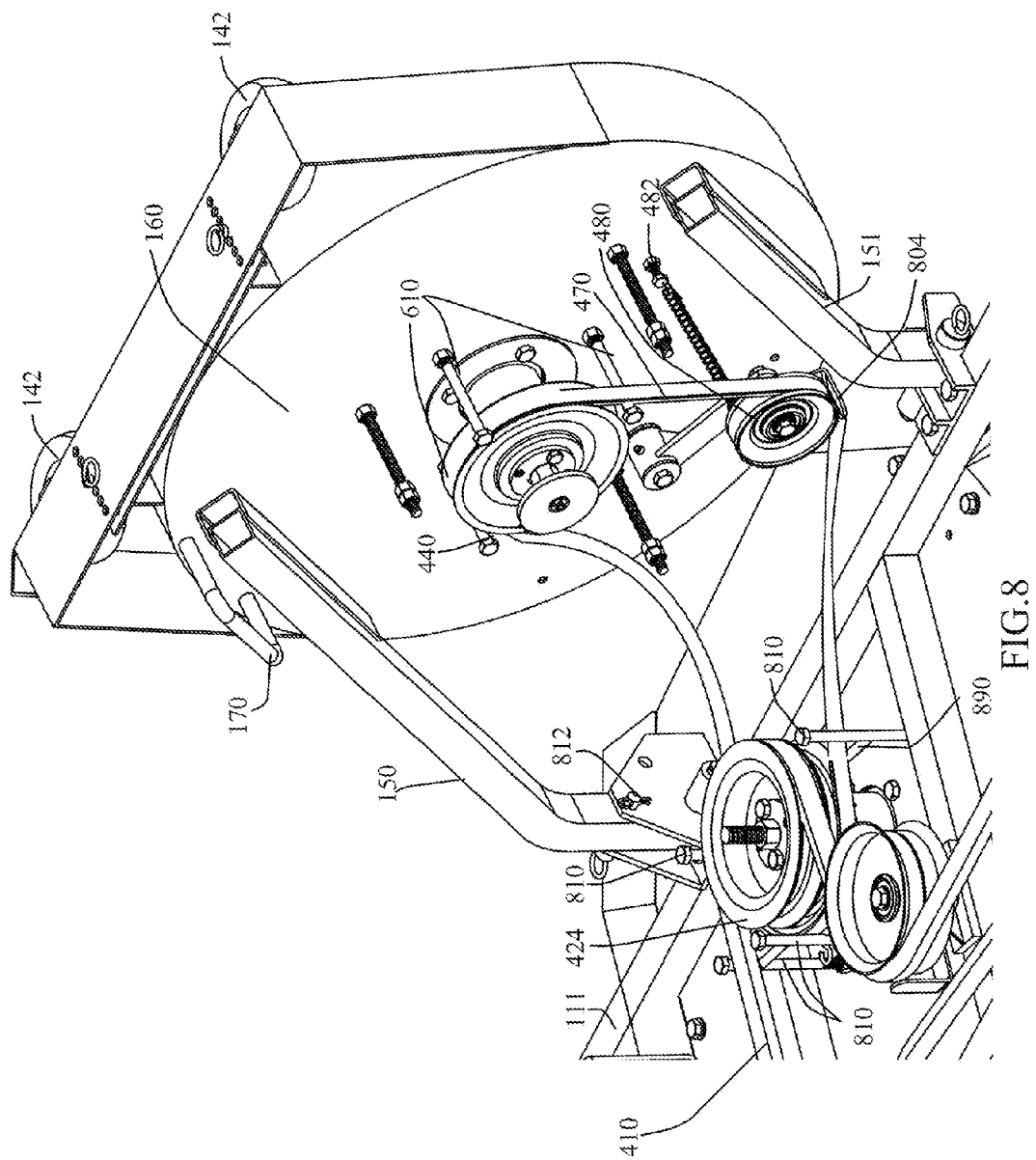
FIG. 8 shows a front perspective view of a right wing mower in a raised position in accordance with one aspect of the present invention.

FIG. 8 displays a rear perspective view of the right wing mower 160 in the raised position. In the embodiment shown, three belt retainers 610 are shown dispersed around the right wing pulley 440. The belt retainers 610 may be positioned to keep the right wing belt 470 from traveling away from the right wing pulley 440. In one embodiment, the belt retainers 610 may be positioned around the circumference of the right wing pulley 440 such that there is very little clearance between the edge of the right wing pulley 440 and the belt retainers 610. In this embodiment, it may be necessary to remove the belt retainers 610 when removing the right wing belt 470. When the right wing mower 160 is in the lowered position, the tension on the right wing belt 470 keeps it from coming into contact with the belt retainers 610. When the right wing mower 160 is in the raised position, the slack experienced by the right wing belt 470 may be enough to cause the belt 470 to move off right wing pulley 440 if not kept in place by the belt retainers 610.

Also keeping the right wing belt 470 in place on the tension pulley 480 is a right tension pulley retainer 804. In the embodiment of FIG. 8, the right tension pulley retainer 804 may be in a fixed position. When the right wing mower 160 is in the raised position, the right tension pulley retainer 804 may provide pressure against the right wing belt 470 keeping it from coming off the right tension pulley 480. Similar to the left tension pulley 450, the right tension pulley 480 will stop at a predetermined point when the right wing mower 160 is raised to the raised position. When the right wing mower 160 is lowered, the right tension pulley 480 will travel forward until the slack in the right wing belt 470 is removed. Located around the right main deck pulley 424 are belt posts 810 upon which are attached belt supports 890. When the right wing mower 160 is raised, the right wing belt 470 experiences slack and the right wing belt 470 may move out of its groove on the right main deck pulley 424. When this occurs, the right wing belt 470 may be supported by belt supports 890.

On the front support arm 150 of the right wing mower 160 is a locking pin 812. When the right wing mower 160 is in the lowered position, the locking pin 812 may be installed in a lower position. When the right wing mower 160 is in the lowered position, the locking pin 812 may be installed such that the movement of the right wing mower 160 may be limited to a certain predetermined articulation. For example, the right wing mower may travel about 15 degrees upwards and 10 degrees downward.

Figure 9:
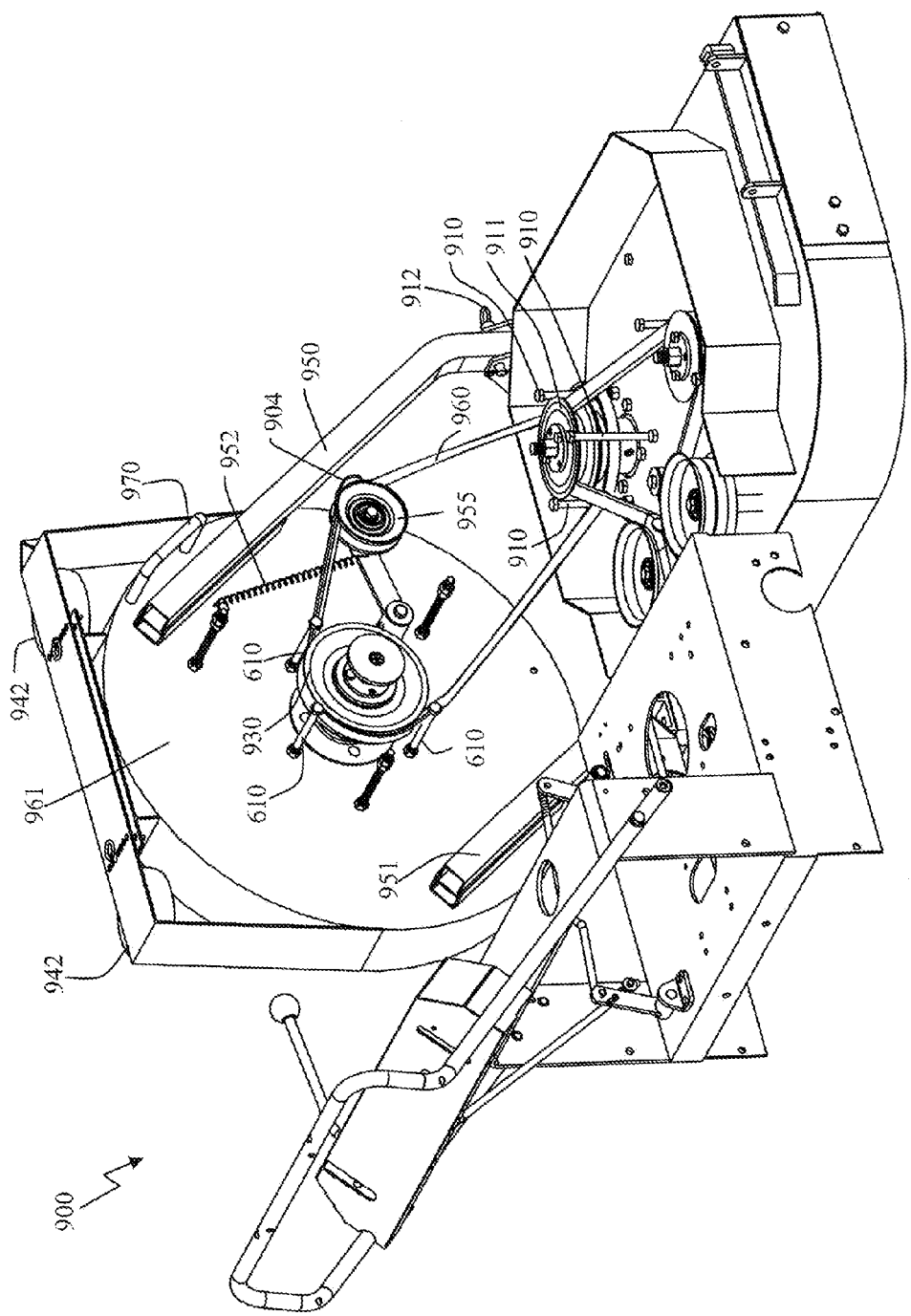
FIG. 9 shows a side perspective view of a single wing mower in accordance with one embodiment of the present invention.

FIG. 9 displays a walk behind mower 900 having a single wing mower 961 in accordance with another embodiment of the present invention. In the embodiment shown, three belt retainers 610 are shown dispersed around the wing pulley 930. The belt retainers 610 may be positioned to keep the wing belt 960 from traveling too far away from wing pulley 930. In one embodiment the belt retainers 610 may be positioned around the circumference of the wing pulley 930 such that there is very little clearance between the edge of the wing pulley 930 and the belt retainers 610. In this embodiment, it may be necessary to remove the belt retainers 610 when removing the wing belt 960. When the wing mower 961 is in the lowered position, the tension on the wing belt 960 keeps it from coming into contact with the belt retainers 610. When the left wing mower 961 is in the raised position, the slack experienced by the wing belt 960 may be enough to cause the wing belt 960 to move off wing pulley 930 if not kept in place by the belt retainers 610. The slack experienced by the wing belt 960 may be directed towards the main drive pulley 911.

Keeping the wing belt 960 positioned on the main drive pulley 911 are belt posts 910 upon which are attached belt supports (not shown for ease of illustration). When the wing mower 961 is raised, the wing belt 960 experiences slack and may move out of its groove on the main drive pulley 911. When this occurs, the wing belt 960 may be supported by the belt supports.

In the embodiment of FIG. 9, the tension pulley retainer 904 may be in a fixed position. When the wing mower 961 is in the raised position, the tension pulley 950 will travel back due to the force applied by tension spring 952. The tension pulley retainer 904 may provide pressure against the wing belt 960 keeping it from coming off the tension pulley 950 when the wing mower 961 is in the raised position.

On front support arm 950 of the wing mower 961 is a locking pin 912. When the wing mower 961 is in the lowered position, the locking pin 912 may be installed in a lower pin position. When the wing mower 961 is in the lowered position, the locking pin 912 may be installed such that the movement of the wing mower 961 may be limited to a certain predetermined articulation. For example, the wing mower 961 may travel about 15 degrees upwards and about 10 degrees downward when in the locking pin is installed in the lower pin position. Although the mower 900 of FIG. 9 only shows one wing mower 961, the walk behind mower 900 may also have two wing mowers.

Figure 10:
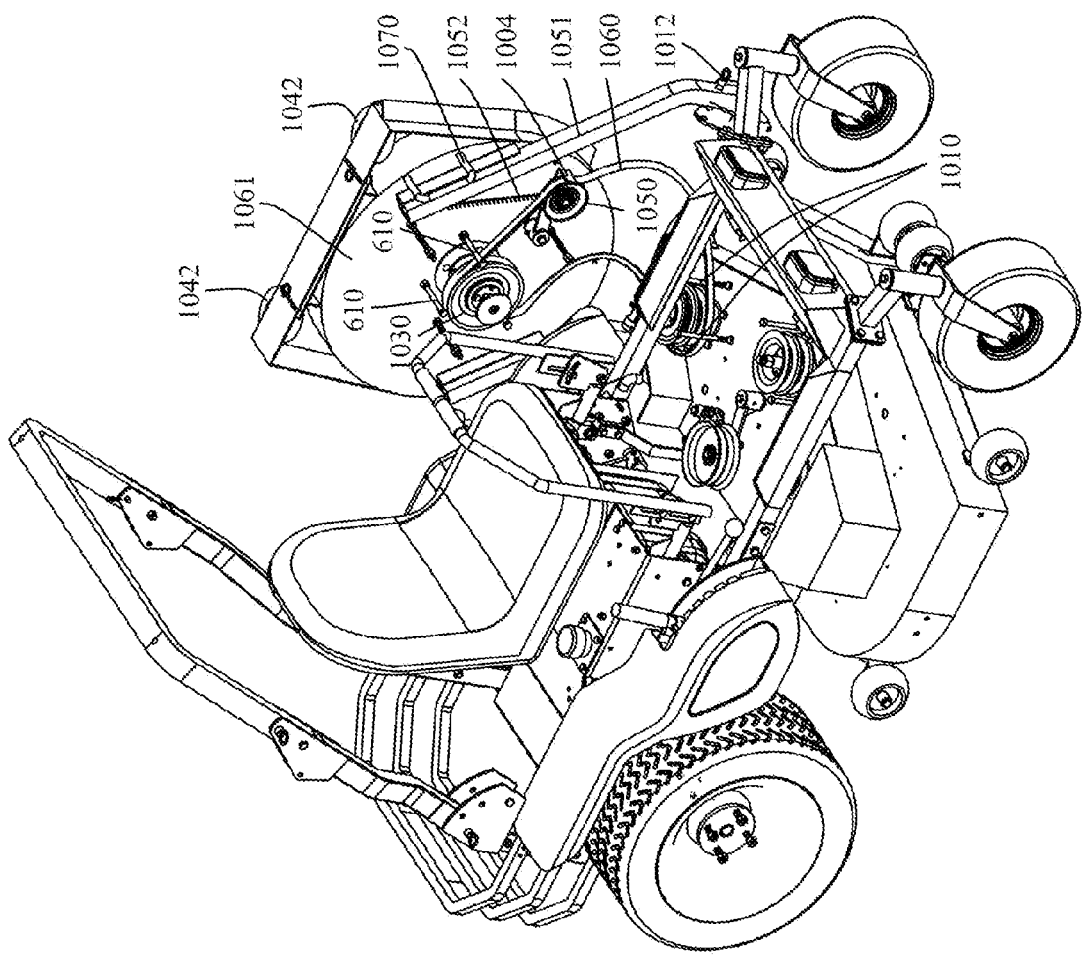
FIG. 10 shows a side perspective view of a riding mower having a single wing mower in accordance with another embodiment of the present invention.

FIG. 10 shows a riding lawn mower 1000 with a wing mower 1061 in accordance with another embodiment of the present invention. In the embodiment shown, belt retainers 1010 are shown dispersed around the wing pulley 1030. The belt retainers 1010 may be positioned to keep the wing belt 1060 from traveling too far away from wing pulley 1030. In one embodiment the belt retainers 610 may be positioned around the circumference of the wing pulley 1030 such that there is very little clearance between the edge of the wing pulley 1030 and the belt retainers 610. In this embodiment, it may be necessary to remove the belt retainers 610 when removing the wing belt 1060. When the wing mower 1061 is in the lowered position, the tension on the wing belt 1060 keeps it from coming into contact with the belt retainers 610. When the left wing mower 1061 is in the raised position, the slack experienced by the wing belt 1060 may be enough to cause the wing belt 1060 to move off wing pulley 1030 if not kept in place by the belt retainers 610. Located around the main drive pulley are belt posts 1010 upon which are attached belt supports (not shown for ease of illustration). When the wing mower 1061 is raised, the wing belt 1060 experiences slack and may move out of its groove on the main drive pulley. When this occurs, the wing belt 1060 may be supported by the belt supports.

Also keeping the wing belt 1060 in place on tension pulley 1050 is a tension pulley retainer 1004. In the embodiment of FIG. 10, the tension pulley retainer 1004 may be in a fixed position. When the wing mower 1061 is in the raised position, the tension pulley 1050 will travel back due to the force applied by tension spring 1052. The tension pulley retainer 1004 may provide pressure against the wing belt 1060 keeping it from coming off the tension pulley 1050 when the wing mower 1061 is in the raised position.

On front support arm 1051 of the wing mower 1061 is a locking pin 1012. When the wing mower 1061 is in the lowered position, the locking pin 1012 may be installed in a lower position. When the wing mower 1061 is in the lowered position, the locking pin 1012 may be installed such that the movement of the wing mower 1061 may be limited to a certain predetermined articulation. For example, the wing mower 1061 may travel about 15 degrees upwards and 10 degrees downward when in the locking pin 1012 is installed in the lower pin position.

Although specific embodiments have been illustrated and described herein, those of ordinary skill in the art appreciate that any arrangement, which is calculated to achieve the same purpose, may be substituted for the specific embodiments shown and that the invention has other applications in other environments. For example, the wing mowers as described herein may be raised and lowered by various means such as manual intervention or the implementation of a hydraulic system. This application is intended to cover any adaptations or variations of the present invention. The following claims are in no way intended to limit the scope of the invention to the specific embodiments described herein.

What is claimed is:

1. A lawn mower having a main mower deck and a wing mower having a rotating cutting blade the wing mower affixed to the main mower deck by support arms, the wing mower moveable between a lowered position and a raised position comprising:
    a) a main deck pulley with a pulley groove and having a main deck belt for rotating the main deck pulley,
    b) a wing mower pulley with a pulley groove which wing mower pulley rotates the cutting blade when the wing mower pulley rotates,
    c) a wing mower belt coupling the main deck pulley to the wing mower pulley,
    d) a tension pulley applying tension to the wing mower belt when the wing mower is in a lowered position, wherein the tension applied to the wing mower belt is removed by the movement of the wing mower into the raised position such that the slack created thereby causes the wing mower pulley and blade to be disengaged from rotating and having a tension pulley retainer positioned to keep the wing mower belt from coming off the tension pulley,
    e) a plurality of wing mower belt retainers holding the wing mower belt in place around the wing mower pulley by wing mower belt the retainers positioned around the circumference of the wing mower pulley, such that the wing mower belt slack is directed to the main deck pulley the wing mower belt retainers allowing the wing mower belt to disengage from the wing mower pulley when tension to the belt is removed as the wing mower is in the raised position, the wing mower belt retainers directing the wing mower belt against the wing mower pulley groove when the wing mower transitions to the lowered position; and
    f) a main deck pulley retainer which guides the belt back into the main deck pulley groove when the wing transitions into the lowered position.

2. The lawn mower of claim 1 wherein the wing mower may articulate in an upward direction when in the lowered position.

3. The lawn mower of claim 1 wherein the wing mower may articulate in a downward direction when in the lowered position.

4. The lawn mower of claim 1 wherein lawn mower is a towed lawn mower.

5. The lawn mower of claim 1 wherein lawn mower is a self propelled lawn mower.

6. The lawn mower of claim 5 wherein lawn mower is a zero turn radius self propelled lawn mower.

7. The lawn mower of claim 5 wherein lawn mower is a walk behind lawn mower.

8. The lawn mower of claim 7 wherein lawn mower is a zero turn radius lawn mower.

9. The lawn mower of claim 1 further comprising a drive pulley and belt posts, the drive pulley coupled to the wing mower belt and the belt posts positioned around the drive pulley.

10. The lawn mower of claim 9 further comprising belt supports positioned on the belt posts, the belt supports supporting the wing mower belt when the wing mower is in the raised position.

11. The lawn mower of claim 1 wherein the wing mower articulates between about 15 degrees in an upward direction and about 10 degrees in a downward direction when the wing mower is in the lowered position.

12. The wing mower of claim 1 further comprising a flexible guard, the flexible guard protecting the wing belt.

* * * * *